United States Patent
Chen et al.

(10) Patent No.: US 11,611,237 B2
(45) Date of Patent: Mar. 21, 2023

(54) WIRELESS POWER RECEPTION APPARATUS AND MOBILE TERMINAL

(71) Applicant: GUANGDONG OPPO MOBILE TELECOMMUNICATIONS CORP., LTD., Guangdong (CN)

(72) Inventors: Shebiao Chen, Guangdong (CN); Jialiang Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 275 days.

(21) Appl. No.: 17/021,402

(22) Filed: Sep. 15, 2020

(65) Prior Publication Data
US 2020/0412169 A1    Dec. 31, 2020

Related U.S. Application Data (63) Continuation of application No. PCT/CN2018/088491, filed on May 25, 2018.

(51) Int. Cl.
*H01F 38/14*    (2006.01)
*H02J 50/40*    (2016.01)
(Continued)

(52) U.S. Cl.
CPC .............. *H02J 50/10* (2016.02); *H02J 7/007* (2013.01); *H02J 50/80* (2016.02); *H02J 2310/22* (2020.01)

(58) Field of Classification Search
CPC .. H02J 50/10; H02J 7/007; H02J 50/80; H02J 2310/22; H02J 2207/10; H02J 50/005;
(Continued)

(56) References Cited

U.S. PATENT DOCUMENTS 5,701,121 A    12/1997    Murdoch
5,920,466 A *  7/1999    Hirahara ........... H02M 3/33523
                                                    363/21.02
(Continued)

FOREIGN PATENT DOCUMENTS

CN        2177283 Y    9/1994
CN      206117963 U    4/2017
(Continued)

OTHER PUBLICATIONS

India First Examination Report for IN Application 202017035764 dated Jan. 27, 2021. (6 pages).
(Continued)

*Primary Examiner* — Nghia M Doan
(74) *Attorney, Agent, or Firm* — Young Basile Hanlon & MacFarlane, P.C.

(57) ABSTRACT

A wireless power reception apparatus and a mobile terminal are provided. The wireless power reception apparatus includes the following. A coil includes a first end, a second end, and a tap. The coil defined by the first end and the second end is configured to provide a first voltage, and the coil defined by the first end and the tap is configured to provide a second voltage. A first rectifying unit coupled with the first end and the second end of the coil. A second rectifying unit coupled with the first end and the tap of the coil. A charging unit coupled with the first rectifying unit and configured to apply the first voltage to a battery for charging. A power supply unit coupled with the second rectifying unit and configured to apply the second voltage to power a wireless receiving chip.

20 Claims, 7 Drawing Sheets

(51) Int. Cl.
*H02J 50/10* (2016.01)
*H02J 50/80* (2016.01)
*H02J 7/00* (2006.01)

(58) Field of Classification Search
CPC .......... H02J 50/402; H02J 7/04; H01F 38/14; H04B 5/0037
See application file for complete search history.

(56) References Cited

U.S. PATENT DOCUMENTS

| | | | | |
|---|---|---|---|---|
| 7,400,061 | B2* | 7/2008 | Steigerwald | H02M 3/33561 307/17 |
| 8,531,153 | B2* | 9/2013 | Baarman | H02J 50/12 320/108 |
| 2002/0064058 | A1* | 5/2002 | Zhang | H02M 3/01 363/17 |
| 2015/0130516 | A1 | 5/2015 | Asai et al. | |
| 2017/0104356 | A1 | 4/2017 | Yu et al. | |
| 2018/0013309 | A1* | 1/2018 | Winkler | H02J 50/12 |
| 2021/0066952 | A1* | 3/2021 | Chen | H02J 7/04 |

FOREIGN PATENT DOCUMENTS

| | | |
|---|---|---|
| EP | 3252915 A1 | 12/2017 |
| JP | 2013027171 A | 2/2013 |
| JP | 2015136274 A | 7/2015 |
| JP | 6000131 B2 | 9/2016 |
| JP | 2017511114 A | 4/2017 |
| JP | 2018064308 A | 4/2018 |
| WO | 2003085797 A2 | 10/2003 |
| WO | 2013012088 A1 | 1/2013 |

OTHER PUBLICATIONS

Extended European Search Report for EP Application 18919762.7 dated Feb. 1, 2021. (7 pages).
International search report issued in corresponding international application No. PCT/CN2018/088491 dated Feb. 26, 2019.
Australian Examination Report for AU Application 2018424953 dated Apr. 20, 2021. (3 pages).
Japanese Office Action with English Translation for JP Application 2020-549804 dated Oct. 29, 2021. (10 pages).
Korean Office Action with English Translation for KR Application 1020207026862 dated May 26, 2022. (10 pages).

* cited by examiner

WIRELESS POWER RECEPTION APPARATUS AND MOBILE TERMINAL

CROSS-REFERENCE TO RELATED APPLICATION(S)

This application is a continuation of International Application No. PCT/CN2018/088491, filed on May 25, 2018, the disclosure of which is hereby incorporated by reference in its entirety.

TECHNICAL FIELD

This disclosure relates to the technical field of wireless charging, and more particularly to a wireless power reception apparatus and a mobile terminal.

BACKGROUND

Currently, in the field of charging, devices to-be-charged are usually charged in a wired charging manner.

Take mobile phones as an example. Currently, the mobile phone is charged mainly in a wired charging manner. When the mobile phone needs to be charged, the mobile phone can be coupled with a power supply device via a charging cable (such as a universal serial bus (USB) cable), and through the charging cable, an output power of the power supply device can be delivered to the mobile phone to charge a battery of the mobile phone.

For the device to-be-charged, the charging cable is needed for wired charging. This will result in complicated operations in a charging preparation stage. Therefore, a wireless charging manner is enjoying increasing popularity among consumers. However, a conventional wireless charging manner may easily cause a significant loss of a wireless receiving chip and thus lead to serious heat generation of the wireless receiving chip and therefore, needs to be improved.

SUMMARY

In a first aspect, a wireless power reception apparatus is provided. The wireless power reception apparatus includes a coil, a first rectifying unit, a second rectifying unit, a charging unit, and a power supply unit. The coil includes a first end, a second end, and a tap. The coil defined by the first end and the second end is configured to provide a first voltage, and the coil defined by the first end and the tap is configured to provide a second voltage. The first rectifying unit is coupled with the first end and the second end of the coil. The second rectifying unit is coupled with the first end and the tap of the coil. The charging unit is coupled with the first rectifying unit and is configured to apply the first voltage to a battery for charging. The power supply unit is coupled with the second rectifying unit and is configured to apply the second voltage to power a wireless receiving chip.

In a second aspect, a mobile terminal is provided. The mobile terminal may include the above wireless power reception apparatus. The mobile terminal includes a battery, a wireless receiving chip, first rectifying unit, a second rectifying unit, a charging unit, and a power supply unit. The coil includes a first end, a second end, and a tap. The coil defined by the first end and the second end is configured to provide a first voltage, and the coil defined by the first end and the tap is configured to provide a second voltage. The first rectifying unit is coupled with the first end and the second end of the coil. The second rectifying unit is coupled with the first end and the tap of the coil. The charging unit is coupled with the first rectifying unit and the battery, and is configured to apply the first voltage to the battery for charging. The power supply unit is coupled with the second rectifying unit and the wireless receiving chip, and is configured to apply the second voltage to power the wireless receiving chip.

BRIEF DESCRIPTION OF DRAWINGS

The above and/or additional aspects and advantages of implementations will become apparent and easily understood from the following description of implementations in conjunction with the accompanying drawings.

DETAILED DESCRIPTION

In implementations of the disclosure, a device to-be-charged is charged through wireless charging technology. The wireless charging technology does not require a cable for power delivery, which can simplify operations in a charging preparation stage.

According to conventional wireless charging technology, a power supply device (such as an adaptor) is generally coupled with a wireless power supply apparatus (that is, wireless charging transmitting apparatus), such as a wireless charging base, and via the wireless power supply apparatus, an output power of the power supply device is delivered to the device to-be-charged wirelessly (for example, via an electromagnetic signal or an electromagnetic wave) for wireless charging of the device to-be-charged. According to various wireless charging principles, the wireless charging can be in the manner of magnetic coupling (or electromagnetic induction), magnetic resonance, and radio waves. At present, main wireless charging standard includes QI standard, power matters alliance (PMA) standard, and alliance for wireless power (A4WP) standard. Under the QI standard and the PMA standard, magnetic coupling is adopted for wireless charging, and under the A4WP standard, magnetic resonance is adopted for wireless charging.

In the following, a conventional wireless charging manner will be described in connection with FIG. 1.

Figure 1:
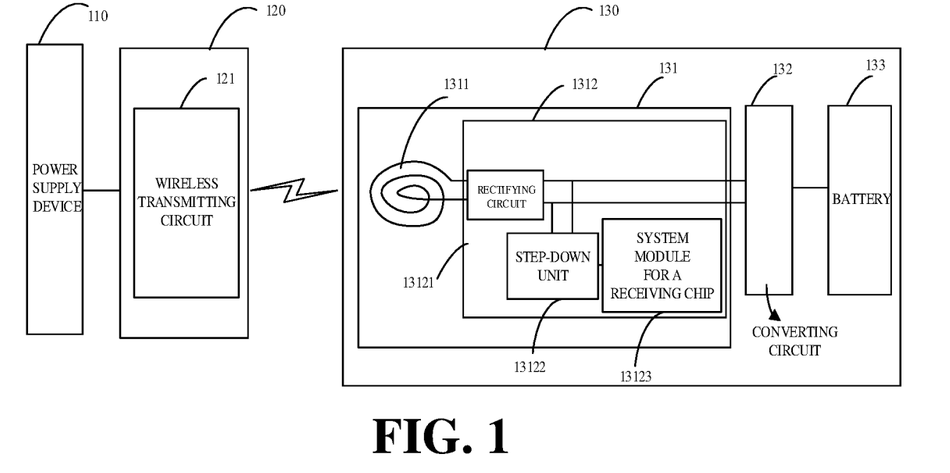
FIG. 1 is an example structural diagram of a conventional wireless charging system.

As illustrated in FIG. 1, a wireless charging system includes a power supply device 110, a wireless power supply apparatus 120, and a device to-be-charged 130. The wireless power supply apparatus 120 can be, for example, a wireless charging base. The device to-be-charged 130 can be, for example, a terminal.

After the power supply device 110 is coupled with the wireless power supply apparatus 120, an output current of the power supply device 110 can be transmitted to the wireless power supply apparatus 120. The wireless power supply apparatus 120 can convert, via an internal wireless transmitting circuit 121, the output current of the power supply device 110 into an electromagnetic signal (or an electromagnetic wave) for transmission. For example, the wireless transmitting circuit 121 can convert the output current of the power supply device 110 into an alternating current (AC) and convert, via a transmitting coil or a transmitting antenna (not illustrated in FIG. 1), the AC into an electromagnetic signal.

The device to-be-charged 130 can receive, via a wireless receiving circuit 131, an electromagnetic signal from the wireless transmitting circuit 121 and convert the electromagnetic signal into an output voltage and an output current of the wireless receiving circuit 131. For example, the wireless receiving circuit 131 may include a receiving coil or receiving antenna 1311 and a wireless receiving chip 1312. The wireless receiving chip 1312 may include a rectifying circuit 13121, a step-down unit 13122, and a system module 13123 for the receiving chip. Via the receiving coil or receiving antenna 1311, an electromagnetic signal transmitted by the wireless transmitting circuit 121 can be converted into an AC, and the AC can be rectified and/or filtered with the rectifying circuit 13121 to obtain the output voltage of the rectifying circuit 13121. In addition, the output voltage of the rectifying circuit 13121 can be decreased with the step-down unit 13122 to obtain the output voltage and the output current of the wireless receiving circuit 131 to be applied to the system module 13123 (such as a controller or a timer inside the wireless receiving chip 1312), that is, to power the wireless receiving chip 1312.

The output voltage of the wireless receiving circuit 131 is however not suitable to be directly applied to a battery 133. Instead, the output voltage of the wireless receiving circuit 131 needs to be converted by a converting circuit 132 of the device to-be-charged 130 to obtain an expected charging voltage and/or an expected charging current of the battery 133 of the device to-be-charged 130.

As an example, the converting circuit 132 can be a charging management unit, such as a charging integrated circuit (IC). When the battery 133 is charged, the converting circuit 132 may be configured to manage a charging voltage and/or a charging current of the battery 133. The converting circuit 132 can have at least one of a voltage feedback function and a current feedback function to achieve management of at least one of a charging voltage and a charging current of the battery 133 respectively. For example, a charging process of the battery can include at least one of a trickle charging stage, a constant-current charging stage, and a constant-voltage charging stage. In the trickle charging stage, the converting circuit 132 can utilize a current feedback function to make current flowing into the battery 133 in the trickle charging stage satisfy the expected charging current of the battery 133 (such as a first charging current). In the constant-current charging stage, the converting circuit 132 can utilize the current feedback function to make current flowing into the battery 133 in the constant-current charging stage satisfy the expected charging current of the battery 133 (such as a second charging current, which may be larger than the first charging current). In the constant-voltage charging stage, the converting circuit 132 can utilize a voltage feedback function to make voltage applied to the battery 133 in the constant-voltage charging stage satisfy the expected charging voltage of the battery 133.

As one example, when the output voltage of the wireless receiving circuit 131 is higher than the expected charging voltage of the battery 133, the converting circuit 132 can be configured to decrease (that is, step down) the output voltage of the wireless receiving circuit 131 to make decreased charging voltage meet requirements on the expected charging voltage of the battery 133. For example, the output voltage of the wireless receiving circuit 131 is constant 5V (volt). When the battery 133 includes one single cell (here, a lithium battery is taken as an example of the cell, and a charging cut-off voltage of a single lithium battery cell is generally 4.2V), the converting circuit 132 (such as a buck circuit) can decrease the output voltage of the wireless receiving circuit 131, such that the decreased charging voltage meets requirements on the expected charging voltage of the battery 133.

As another example, when the output voltage of the wireless receiving circuit 131 is lower than the expected charging voltage of the battery 133, the converting circuit 132 can be configured to increase (that is, step up) the output voltage of the wireless receiving circuit 131 to make increased charging voltage meet requirements on the expected charging voltage of the battery 133. For example, the output voltage of the wireless receiving circuit 131 is a constant 5V. When the battery 133 includes two or more cells coupled in series (here, lithium battery is taken as an example of the cell, and a charging cut-off voltage of a single lithium battery cell is generally 4.2V), the converting circuit 132 (such as a boost circuit) can increase the output voltage of the wireless receiving circuit 131, such that the increased charging voltage meets requirements on the expected charging voltage of the battery 133.

As can be seen, the system module 13123 for the receiving chip is powered by the step-down unit 13122, and the step-down unit 13122 takes power directly from the rectifying circuit 13121. In general, the system unit 13123 has a low operating voltage (such as 1.8V or 3.3V). When the output voltage of the rectifying circuit 13121 is high (such as 15V), a voltage difference between an input voltage and an output voltage of the step-down unit 13122 will be large. This can lead to substantial loss of the step-down unit 13122 and as a result, a significant amount of heat will be generated in the wireless receiving chip 1312.

To solve the above problem, implementations provide a wireless power reception apparatus (that is, wireless charging receiving apparatus). In the wireless power reception apparatus, a tap is added in the receiving coil, or an in-between position is set in the receiving antenna, the in-between position refers to a position between a start position and an end position, and a corresponding rectifying unit is provided, to power the wireless receiving chip via the tap and the rectifying unit. The tap of the coil can be adjusted according to an output voltage of the rectifying unit. In this way, the voltage difference between an input voltage and an output voltage of the step-down unit 260 may be substantially reduced, which is possible to reduce loss of the step-down unit 260 and heating of the wireless receiving chip.

By adding at least one tap to a coil and providing at least one corresponding rectifying unit to power a wireless receiving chip, loss of the wireless receiving chip can be effectively reduced, thereby reducing heat generation.

Figure 2:
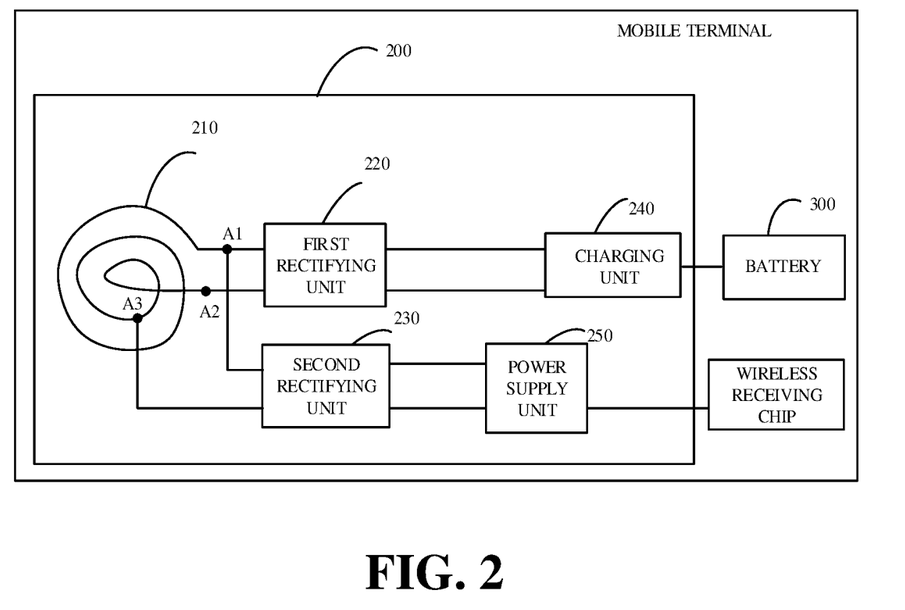
FIG. 2 is a schematic structural diagram of a wireless power reception apparatus according to implementations.

The following will describe in detail a wireless power reception apparatus 200 according to implementations with reference to FIG. 2.

As illustrated in FIG. 2, the wireless power reception apparatus 200 according to implementations includes a coil 210, a first rectifying unit 220, a second rectifying unit 230, a charging unit 240, and a power supply unit 250 for a wireless receiving chip.

In some implementations, the coil 210 is configured to convert an electromagnetic signal transmitted by a wireless transmitting circuit of a wireless power supply apparatus into an AC. The coil 210 includes a first end A1, a second end A2, and a tap A3, where the coil defined by the first end A1 and the second end A2 is configured to provide a first voltage, the coil defined by the first end A1 and the tap A3 is configured to provide a second voltage, and the first voltage is higher than the second voltage. In other words, upon receiving an electromagnetic signal transmitted by the wireless power supply apparatus, the wireless power reception apparatus 200 can convert, via the coil 210 defined by the first end A1 and the second end A2, the electromagnetic signal into a first AC of the first voltage and convert, via the coil 210 defined by the first end A1 and the tap A3, the electromagnetic signal into a second AC of the second voltage.

In the wireless power reception apparatus provided herein, a tap is provided between the first end and the second end of the coil, such that the coil defined by the first end and the second end provides the first voltage and the coil defined by the first end and the tap provides the second voltage.

It should be noted that, in implementations illustrated in FIG. 2, alternatively, the coil 210 may be replaced by an antenna. The first end A1, the second end A2, and the tap A3 of the coil 210 correspond to three different positions of the antenna respectively, and with aid of the three different positions, ACs falling into different voltage ranges can be obtained.

The first rectifying unit 220 is coupled with the first end A1 and the second end A2 of the coil 210. The second rectifying unit 230 is coupled with the first end A1 and the tap A3 of the coil 210. The charging unit 240 is coupled with the first rectifying unit 220 and is configured to apply the first voltage to a battery 300 for charging. The power supply unit 250 is coupled with the second rectifying unit 230 and is configured to apply the second voltage to power the wireless receiving chip. This can effectively reduce loss of the wireless receiving chip, thereby reducing heat generation. As illustrated in FIG. 2, when charging the battery 300, the first rectifying unit 220 converts the first AC outputted from the first end A1 and the second end A2 of the coil 210 into a first direct current (DC) and outputs the first DC to the charging unit 240. The charging unit 240 converts the first DC into an expected charging voltage and/or an expected charging current of the battery 300 to be applied to the battery 300 for charging. At the same time, the second rectifying unit 230 converts the second AC outputted from the first end A1 and the tap A3 of the coil 210 into a second DC and outputs the second DC to the power supply unit 250 that powers the wireless receiving chip.

It should be noted that, the position of the tap A3 can be determined according to an operating voltage of the wireless receiving chip to minimize loss of the wireless receiving chip, thus greatly reducing heat generation of the wireless receiving chip. As an example, voltage required by the wireless receiving chip may be 1.8V, 3.3V, etc, and accordingly tap positions can be set differently according to various voltage requirements, that is, more than one tap A3 is provided, such that different voltages can be applied to different units of the wireless receiving chip. As another example, the position of the tap A3 may be set according to minimum voltage requirements of the wireless receiving chip. For a unit with higher voltage requirement, a boosted voltage (that is, a voltage that is subjected to boost conversion) is applied to the unit. Alternatively, the position of the tap A3 may be set according to maximum voltage requirements of the wireless receiving chip. For a unit with lower voltage requirement, a bucked voltage (that is, a voltage that is subjected to buck conversion) is applied to the unit.

Figure 3:
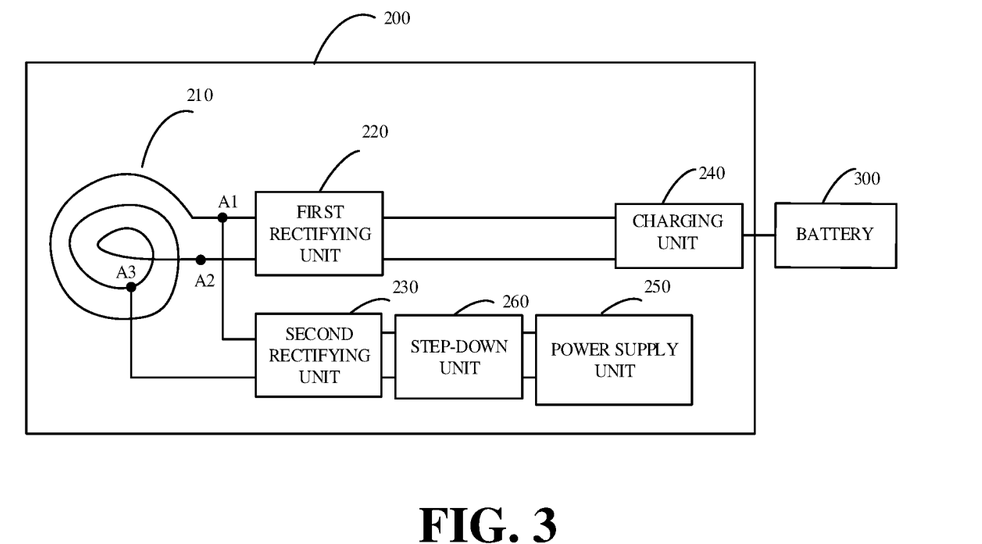
FIG. 3 is a schematic structural diagram of a wireless power reception apparatus according to other implementations.

In some implementations, as illustrated in FIG. 3, the wireless power reception apparatus 200 further includes a step-down unit 260. The step-down unit 260 is coupled between the second rectifying unit 230 and the power supply unit 250 and is configured to decrease the second voltage to a third voltage to be applied to the wireless receiving chip.

By adjusting the position of the tap A3 of the coil 210, an output voltage of the second rectifying unit 230 can be adjusted to reduce loss of the wireless receiving chip as much as possible, thereby greatly reducing heating of the wireless receiving chip. However, when the operating voltage of the wireless receiving chip is low (such as 1.8V), a distance between the position of the tap A3 of the coil 210 and the first end A1 is short, and as a result, wireless electrical energy that can be received is weak. In addition, due to a power switch transistor of the second rectifying unit 230, it is difficult to directly obtain a voltage that matches the operating voltage of the wireless receiving chip. Therefore, according to some implementations, the step-down unit 260 is arranged between the second rectifying unit 230 and the power supply unit 250. With aid of the step-down unit 260, the output voltage of the second rectifying unit 230 can be decreased to the operating voltage of the wireless receiving chip. Since the position of the tap A3 of the coil 210 is determined according to a present output voltage of the second rectifying unit 230, it is possible to guarantee a small voltage difference between an input voltage and an output voltage of the step-down unit 260, which can allow for reduced loss of the step-down unit 260, thereby reducing heating of the wireless receiving chip.

Figure 4:
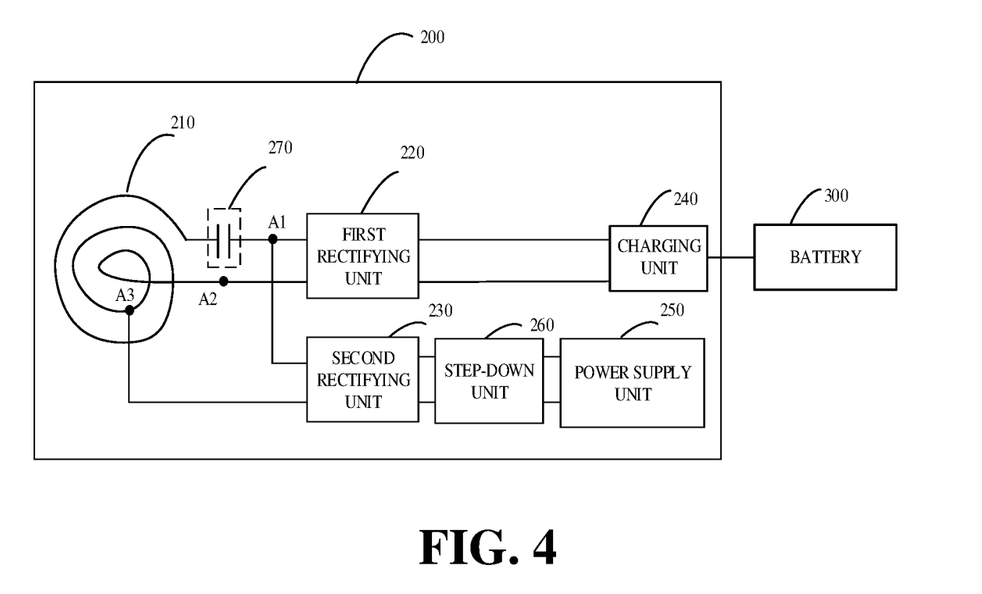
FIG. 4 is a schematic structural diagram of a wireless power reception apparatus according to other implementations.

In some examples, as illustrated in FIG. 4, the wireless power reception apparatus 200 can further include a matching unit 270. The matching unit 270 is configured to cooperate with the coil 210 to convert electromagnetic signals into different AC voltages for output.

In some examples, as illustrated in FIG. 4, the matching unit 270 may be arranged before a point of common coupling (such as A1) at an input end of the first rectifying unit 220 and the second rectifying unit 230. That is, the first rectifying unit 220 and the second rectifying unit 230 share one matching unit 270. As such, the matching unit 270 is coupled with the first rectifying unit 220 and the second rectifying unit 230 via the first end A1. The matching unit 270 cooperates with the coil defined by the first end A1 and the second end A2 of the coil 210 to convert an electromagnetic signal into the first AC of the first voltage ("first AC voltage" for short) for output. The matching unit 270 cooperates with the coil defined by the first end A1 and the tap A3 of the coil 210 to convert an electromagnetic signal into the second AC of the second voltage ("second AC voltage" for short) for output. As such, it is possible to convert electromagnetic signals into ACs of different voltages with aid of only one single matching unit 270, and thus the wireless power reception apparatus is simple in hardware structure and advantageously has low cost.

It should be noted that, the first rectifying unit 220 and the second rectifying unit 230 share one matching unit 270. In this situation, the matching unit 270 is required to meet different requirements on voltage. Therefore, it may be difficult to design such a matching unit 270. To this end, more than one matching unit 270 can be provided to reduce difficulty in design.

Figure 5:
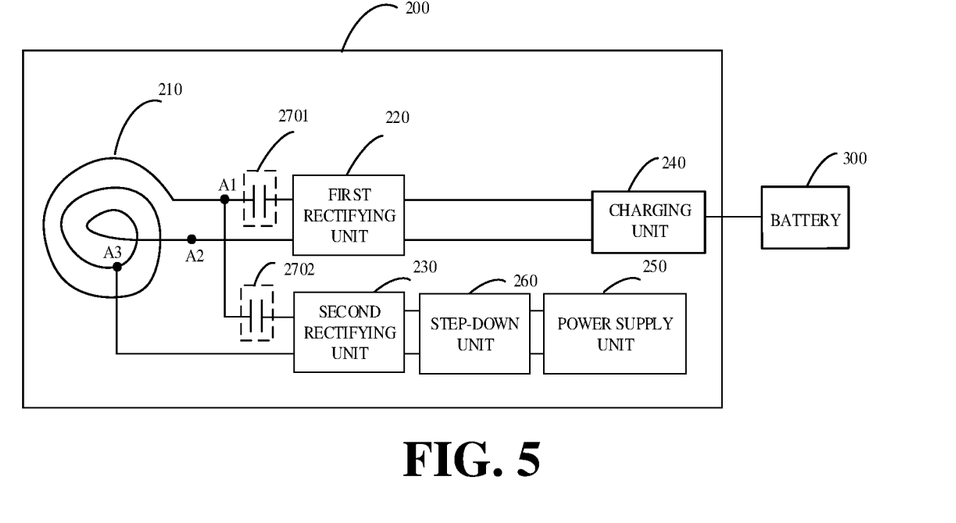
FIG. 5 is a schematic structural diagram of a wireless power reception apparatus according to other implementations.

In other examples, as illustrated in FIG. 5, two matching units 270 are provided, where each of the two matching units 270 is arranged between the first end A1 of the coil 210 and a corresponding rectifying unit. For example, a matching unit 2701 is arranged between the first end A1 of the coil 210 and the first rectifying unit 220 and is configured to cooperate with the coil defined by the first end A1 and the second end A2 of the coil 210 to convert an electromagnetic signal into the first AC of the first voltage for output. A matching unit 2702 is arranged between the first end A1 of the coil 210 and the second rectifying unit 230 and is configured to cooperate with the coil defined by the first end A1 and the tap A3 of the coil 210 to convert an electromagnetic signal into the second AC of the second voltage for output. As such, with aid of the two matching units 270, electromagnetic signals can be converted into ACs of different voltages, which is simple in design.

It should be noted that, there is no restriction on the form of the matching unit 270. In some examples, as illustrated in FIG. 4 or FIG. 5, the matching unit 270 may be implemented as a capacitor.

In the wireless power reception apparatus provided herein, the wireless receiving chip is powered by adding the tap in the coil and providing a corresponding rectifying unit, which can effectively reduce loss of the wireless receiving chip, thereby reducing heat generation.

In addition, as described above, in conventional wireless charging technology, as illustrated in FIG. 1, the wireless receiving circuit 131 is usually provided with the receiving coil or receiving antenna 1311 and the rectifying circuit 13121 to receive the electromagnetic signal transmitted by the wireless transmitting circuit 121, convert the electromagnetic signal into an AC, and rectify and/or filter the AC to output a DC to be applied to the battery 133 for charging. However, since the receiving coil or receiving antenna 1311 and the rectifying circuit 13121 are relatively simple in structure, the device to-be-charged 130 is only applicable to one wireless charging scheme, for example, the device to-be-charged 130 is only applicable to a wireless charging scheme under a conventional QI standard, which results in lack of charging compatibility of the device to-be-charged 130.

Taking the above into consideration, in the wireless power reception apparatus 200 provided herein, the receiving coil is provided with at least one tap (or the receiving antenna is provided with at least one in-between position), and at least one corresponding rectifying unit is provided. With aid of the at least one tap and the at least one corresponding rectifying unit, various wireless charging modes can be provided for the device to-be-charged, such that the device to-be-charged can be compatible with two or more wireless charging schemes. For example, besides the wireless charging scheme under the conventional QI standard, the device to-be-charged can be compatible with a high-voltage wireless charging scheme. This can effectively improve charging compatibility of the device to-be-charged and thus charging of the device to-be-charged will be more convenient.

Figure 6:
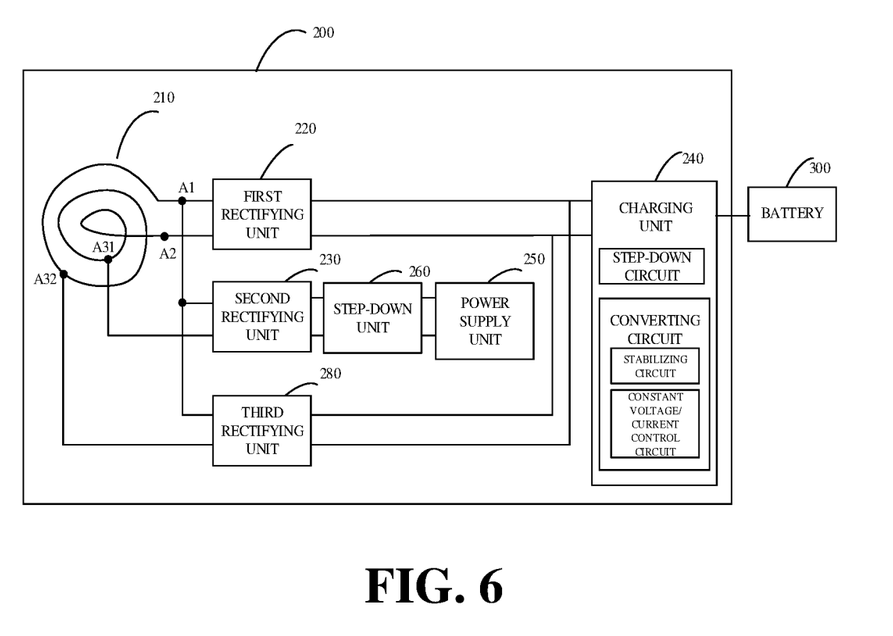
FIG. 6 is a schematic structural diagram of a wireless power reception apparatus according to other implementations.

In some implementations, as illustrated in FIG. 6, the tap A3 of the coil 210 includes a first tap A31 and a second tap A32. The coil defined by the first end A1 and the second end A2 is configured to provide a first voltage. The coil defined by the first end A1 and the first tap A31 of the coil 210 is configured to provide the second voltage. The coil defined by the first end A1 and the second tap A32 of the coil 210 is configured to provide a fourth voltage. The second rectifying unit 230 is coupled with the first end A1 and the first tap A31 of the coil 210.

In some implementations, the wireless power reception apparatus 200 further includes a third rectifying unit 280. The third rectifying unit 280 is coupled with the first end A1 and the second tap A32 of the coil 210. The charging unit 240 is coupled with the first rectifying unit 220 and the third rectifying unit 280. Accordingly, the charging unit 240 is configured to apply the first voltage (received through the first rectifying unit 220) or the fourth voltage (received through the third rectifying unit 280) to the battery 300 for charging. In other words, the wireless power reception apparatus 200 provided herein can be operable with different wireless charging modes, for example, a first wireless charging mode and a second wireless charging mode, where the first wireless charging mode may be the high-voltage wireless charging mode, and the second wireless charging mode may be the wireless charging mode under the conventional QI standard.

For example, when the battery 300 is charged in the first wireless charging mode, the charging unit 240 controls the first rectifying unit 220 to work, so that the first rectifying unit 220 converts the first AC (that is, the first voltage) outputted from the first end A1 and the second end A2 of the coil 210 into the first DC to be applied to the battery 300 for charging. At the same time, the charging unit 240 controls the third rectifying unit 280 to be in a non-working state, to prevent the third rectifying unit 280 from outputting DC which may damage subsequent circuits. When the battery 300 is charged in the second wireless charging mode, the charging unit 240 controls the third rectifying unit 280 to work to convert a fourth AC (that is, the fourth voltage) into a fourth DC to be applied to the battery 300 for charging, and controls the first rectifying unit 220 to be in the non-working state. In this way, different wireless charging schemes can be implemented, which is possible to effectively improve charging compatibility and make charging more convenient. Control of the first rectifying unit 220 and the third rectifying unit 280 can be performed with aid of a control unit and at least one switch, as detailed hereinafter with reference to FIG. 7 and FIG. 8. The control unit can be integrated into the charging unit 240.

It should be noted that, according to implementations, the wireless power reception apparatus 200 does not indiscriminately adopt the first wireless charging mode or the second wireless charging mode to charge the device to-be-charged, that is, the charging unit 240 does not charge the battery 300 randomly with the first rectifying unit 220 or with the third rectifying unit 280. In other words, the charging unit 240 does not indiscriminately apply the first voltage or the fourth voltage to charge the battery 300. Instead, the charging unit 240 communicates with the wireless power supply apparatus to determine a present wireless charging mode.

Figure 7:
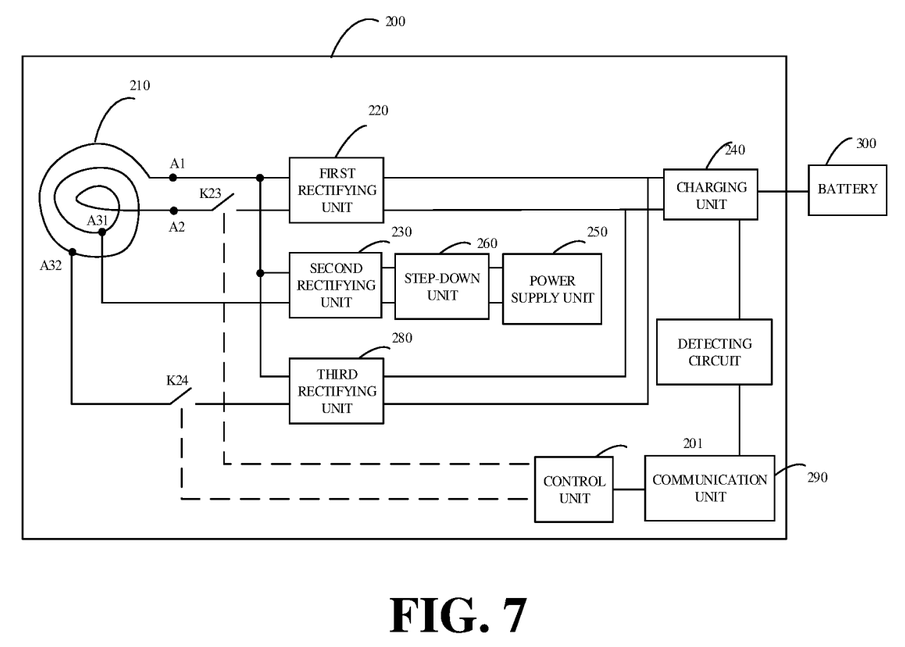
FIG. 7 is a schematic structural diagram of a wireless power reception apparatus according to other implementations.

In some implementations, as illustrated in FIG. 7, the wireless power reception apparatus 200 further include a communication unit 290. The communication unit 290 is configured to communicate with the wireless power supply apparatus to determine the present wireless charging mode and determine a present charging voltage according to the wireless charging mode. The communication unit 290 can be a wireless communication unit and can perform wireless communication with another wireless communication unit (not illustrated in FIG. 7) of the wireless power supply apparatus to determine the present wireless charging mode and communicates the wireless charging mode to the charging unit 240, such that the charging unit 240 can select, according to the wireless charging mode received, the first rectifying unit 220 or the third rectifying unit 280 to charge the battery 300, that is, select the first voltage or the fourth voltage to be applied to the battery 300 for charging.

In some examples, wireless communication between the communication unit 290 and the wireless power supply apparatus (or between the communication unit 290 and the wireless communication unit of the wireless power supply apparatus) may be a two-way wireless communication. In the two-way wireless communication, a recipient is usually required to send a response message to an initiator upon receiving a communication request initiated by the initiator. Under a two-way communication mechanism, communication can be safer. It should be noted that, there is no restriction on which party acts as the initiator or the recipient, that is, any one of two parties (here, the communication unit 290 and the wireless power supply apparatus, or the first wireless communication unit and the second wireless communication unit) may act as the initiator or the recipient. In addition, the manner of communication between the recipient and the initiator is not particularly restricted in implementations. For example, wireless communication may be performed based on Bluetooth, wireless fidelity (Wi-Fi), or backscatter modulation (or power load modulation).

In some examples, as illustrated in FIG. 6, the charging unit 240 may include a step-down circuit. The step-down circuit is configured to decrease a DC outputted by a rectifying unit (here, the first rectifying unit 220 or the third rectifying unit 280 that is coupled with the charging unit 240) to obtain a first charging voltage and a first charging current, where the first charging voltage and the first charging current may be an expected charging voltage and an expected charging current of the battery 300 to be directly applied to the battery 300 for charging.

In some examples, as illustrated in FIG. 6, the charging unit 240 may further include a converting circuit. The converting circuit is configured to conduct voltage control on a DC outputted by the rectifying unit to obtain a second charging voltage and a second charging current to be applied to the battery 300 for charging. The converting circuit may include a circuit for stabilizing voltage ("voltage stabilizing circuit" for short) and a circuit for realizing constant current and constant voltage control (CC/CV) ("CC/CV circuit" for short), where the voltage stabilizing circuit is coupled with the rectifying unit(s), and the CC/CV circuit is coupled with the battery 300.

In some examples, when the battery 300 is charged via the converting circuit, the wireless power supply apparatus may charge the wireless power reception apparatus 200 wirelessly in the wireless charging mode under the conventional QI standard. In this situation, the communication unit 290 communicates to the charging unit 240 the wireless charging mode under the conventional QI standard, where the wireless charging mode under the conventional QI standard is received from the wireless power supply apparatus. The charging unit 240 controls the third rectifying unit 280 to work, so that the third rectifying unit 280 converts a fourth AC (i.e. the fourth voltage) outputted from the first end A1 and the second tap A32 of the coil 210 into a fourth DC. The fourth DC is converted by the converting circuit and then applied to the battery 300 for charging.

However, during charging of the battery 300 with the converting circuit, for example, when the wireless power supply apparatus outputs a power of 20 W (watt) for charging the battery 300 including one single cell, an input voltage of a wireless transmitting unit of the wireless power supply apparatus is required to be 5V and an input current of the wireless transmitting unit is required to be 4 A (ampere). However, an input current of 4 A will certainly result in heating of the coil and thus reduce charging efficiency. If the step-down circuit is used in charging of the battery 300 including one single cell, on condition that a transmission power of the wireless transmitting unit remains constant (20 W), the input voltage of the wireless transmitting unit can be increased, and accordingly the input current of the wireless transmitting unit can be decreased, thereby reducing heating of the coil and improving charging efficiency. In this case, the wireless charging mode adopted by the wireless power supply apparatus is a high-voltage small-current wireless charging mode, that is, the high-voltage wireless charging mode. Accordingly, the communication unit 290 communicates to the charging unit 240 the high-voltage wireless charging mode that is received from the wireless power supply apparatus. The charging unit 240 controls the first rectifying unit 220 to work, so that the first rectifying unit 220 converts the first AC outputted from the first end A1 and the second end A2 of the coil 210 into the first DC. The first DC is decreased by the step-down circuit and then applied to the battery 300 for charging.

In some examples, the step-down circuit can be implemented in various manners. For example, the step-down circuit may be a buck circuit or a charge pump. The charge pump may be composed of multiple switch components. Since the amount of heat generated when a current flows through switch components can be relatively small and almost equal to the amount of heat generated when a current flows directly through a wire, by using the charge pump as the step-down circuit, the voltage can be decreased with a relative reduction in heat generation. As an example, the step-down circuit may be a half-voltage circuit. A ratio of an input voltage to an output voltage of the step-down circuit is a constant 2:1 to further reduce heating of the step-down circuit.

In some examples, the wireless power supply apparatus may include a voltage converting unit (not illustrated). The voltage converting unit is configured to perform voltage conversion on a current to be provided to the wireless transmitting unit when a voltage of the current to be provided to the wireless transmitting unit does not satisfy preset conditions. A boost factor of the voltage converting unit and a step-down factor of the step-down circuit are set according to parameters such as an output voltage that a power supply device is able to provide, a charging voltage required by the battery 300, etc. The boost factor and the step-down factor may be equal to each other or not, which is not limited herein. As an example, the boost factor and the step-down factor may be set to be equal to each other. For instance, the voltage converting unit may be a voltage doubler circuit configured to double an output voltage of the power supply device. The step-down circuit may be a half-voltage circuit configured to decrease an output voltage of the rectifying unit by half.

In some examples, a ratio of the boost factor to the step-down factor is set to be 1:1, such that an output voltage of the step-down circuit and an output current of the step-down circuit are respectively equal to the output voltage of the power supply device and an output current of the power supply device, which is beneficial to simplifying implementation of a control circuit. As an example, a charging current required by the battery 300 is 5 A. When the wireless power supply apparatus is informed by a detecting circuit that the output current of the step-down circuit is 4.5 A, it is necessary to adjust an output power of the power supply device, such that the output current of the step-down circuit reaches 5 A. If the ratio of the boost factor to the step-down factor is not equal to 1:1, when adjusting of the output power of the power supply device, it is necessary to recalculate an adjustment amount of the output power of the power supply device based on a difference between a present output current of the step-down circuit and an expected current. According to implementations, the ratio of the boost factor to the step-down factor is set to be 1:1. In this way, the wireless power reception apparatus 200 only needs to notify a control unit of the wireless power supply apparatus of increasing the output current of the power supply device to 5A, which simplifies feedback and adjustment manner of a wireless charging path.

In some examples, as illustrated in FIG. 7, a charging voltage and/or a charging current outputted by the charging unit 240 can be detected by a detecting circuit and communicated to the communication unit 290, such that the communication unit 290 feeds back the charging voltage and/or the charging current outputted by the charging unit 240 to the wireless power supply apparatus. As such, the wireless power supply apparatus can adjust a transmission power of a wireless transmitting circuit (that is, adjust the wireless charging mode) according to the charging voltage and/or the charging current fed back by the communication unit 290.

In some examples, the wireless power reception apparatus 200 and the wireless power supply apparatus can exchange other information used for adjusting the transmission power of the wireless transmitting unit, such as temperature information of the battery 300, information indicative of a peak value or an average value of a voltage and/or a current in a charging circuit including the step-down circuit, power-delivery efficiency information, etc.

For example, the wireless power reception apparatus 200 may send the power-delivery efficiency information to the wireless power supply apparatus. The wireless power supply apparatus may be further configured to determine an adjustment rate of the transmission power of the wireless transmitting unit according to the power-delivery efficiency information. If the power-delivery efficiency information indicates that the power-delivery efficiency between the wireless transmitting unit and the coil 210 is low, the wireless power supply apparatus can increase the adjustment rate of the transmission power of the wireless transmitting unit, such that the transmission power of the wireless transmitting unit quickly reaches a target transmission power.

For another example, if an output voltage and/or an output current of the rectifying unit has a pulsating waveform, the wireless power reception apparatus 200 can send to the wireless power supply apparatus information indicative of a peak value or an average value of an output voltage and/or an output current in the charging circuit including the step-down circuit. The wireless power supply apparatus can determine whether the peak value or the average value matches a charging voltage and/or a charging current currently required by the battery 300. If the peak value or the average value does not match the charging voltage and/or the charging current currently required by the battery 300, the transmission power of the wireless transmitting unit can be adjusted.

For another example, the wireless power reception apparatus 200 may send the temperature information of the battery 300 to the wireless power supply apparatus. When a temperature of the battery 300 is excessively high, the wireless power supply apparatus can reduce the transmission power of the wireless transmitting unit to decrease the output current of a wireless receiving unit, thereby reducing the temperature of the battery 300.

In some examples, the wireless power reception apparatus 200 and the wireless power supply apparatus can also exchange other types of communication information. As an example, the wireless power reception apparatus 200 and the wireless power supply apparatus can exchange information for safety protection, abnormality detection, or fault handling, such as the temperature information of the battery 300, information indicative of over-voltage protection or over-current protection, etc., or the power-delivery efficiency information. The power-delivery efficiency information is indicative of the power-delivery efficiency between the wireless transmitting unit and the coil 210 and the power-delivery efficiency between the coil 210 and the rectifying unit.

For example, when the temperature of the battery 300 is excessively high, the wireless power reception apparatus 200 and/or the wireless power supply apparatus can control a charging loop to be in a protection state, such as controlling to stop wireless charging through the charging loop. For another example, after receiving the information indicative of over-voltage protection or over-current protection from the wireless power reception apparatus 200, the wireless power supply apparatus can reduce the transmission power, or control the wireless transmitting unit to stop working. For yet another example, after receiving the power-delivery efficiency information from the wireless power reception apparatus 200, the wireless power supply apparatus can control the wireless transmitting unit to stop working when power-delivery efficiency is lower than a preset threshold. The wireless power supply apparatus can notify a user of such event. For an example, the fact that the power-delivery efficiency is excessively low can be displayed via a display screen, or be indicated by an indicator lamp in order for the user to adjust wireless charging environment.

In some examples, as illustrated in FIG. 7, the wireless power reception apparatus 200 further includes a third switch K23, a fourth switch K24, and a control unit 201. The third switch K23 is coupled with the first rectifying unit 220 and the second end A2, and the fourth switch K24 is coupled with the third rectifying unit 280 and the second tap A32. The control unit 201 is configured to control, according to the present charging voltage, one of the third switch K23 and fourth switch K24 to be closed, that is, in an on-state (work state). Specifically, the charging unit 240 is configured to apply the first voltage to the battery when the third switch K23 is closed and the first rectifying unit 220 is in the work state. Or, the charging unit 240 is configured to apply the fourth voltage to the battery when the fourth switch K24 is closed and the second rectifying unit 280 is in the work state.

After determining a wireless charging mode currently required and determining a charging voltage currently required according to the wireless charging mode, the communication unit 290 can communicate the charging voltage to both the charging unit 240 and the control unit 201. Supposing that the charging voltage currently required is the first voltage, the control unit 201 controls the third switch K23 to be closed, such that the second end A2 of the coil 210 is connected to the first rectifying unit 220. The charging unit 240 controls the first rectifying unit 220 to work, so as to charge the battery 300. At the same time, the control unit 201 controls the fourth switch K24 to be opened, that is, in an off-state, such that the second tap A32 of the coil 210 is disconnected from the third rectifying unit 280. This can effectively prevent the third rectifying unit 280 from working by mistake and therefore avoid adversely affecting subsequent circuits. Supposing that the charging voltage currently required is the fourth voltage, the control unit 201 controls the fourth switch K24 to be closed. The charging unit 240 controls the third rectifying unit 280 to work, so as to charge the battery 300. At the same time, the control unit 201 controls the third switch K23 to be opened, to prevent the first rectifying unit 220 from working by mistake and thus avoid adversely affecting subsequent circuits. As such, by controlling the third switch K23 and fourth switch K24, the first rectifying unit 220 or the third rectifying unit 280 can be prevented from working by mistake, which is possible to avoid adverse influence on subsequent circuits, thereby ensuring safety during working of the wireless power reception apparatus 200.

It should be noted that, the communication unit 290 and the control unit 201 may be disposed separately, or may be integrated into the charging unit 240. The charging unit 240 may be a charging management unit and integrated with functions such as control, management, etc. of the whole wireless power reception apparatus 200.

In addition, one or more than one second tap A32 of the coil 210 can be provided, and similarly, one or more than one third rectifying unit 280 can be provided, which is not limited herein.

Figure 8:
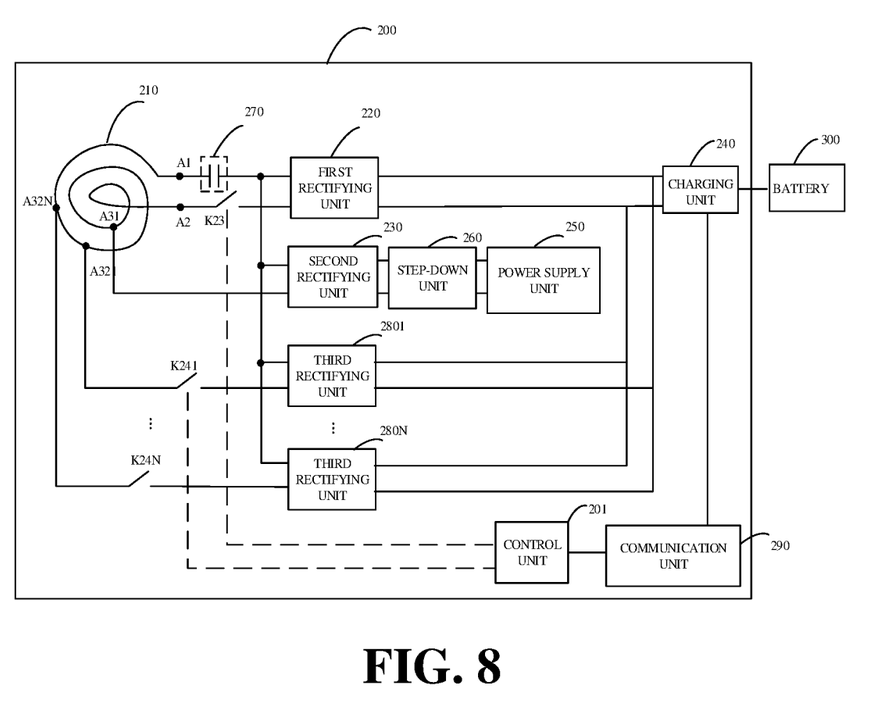
FIG. 8 is a schematic structural diagram of a wireless power reception apparatus according to other implementations.

In some implementations, as illustrated in FIG. 8, more than one second tap A32 of the coil 210 is provided, and accordingly more than one third rectifying unit 280 is provided. The coil defined by the first end A1 of the coil 210 and each of second taps (such as A321, . . . , and A32N) at different positions is configured to provide different voltages. For example, the coil defined by the first end A1 of the coil 210 and a second tap A321 is configured to provide the fourth voltage, . . . , and the coil defined by the first end A1 of the coil 210 and a second tap A32N is configured to provide an $(N+3)^{th}$ voltage. Accordingly, a third rectifying unit 2801 is coupled with the first end A1 of the coil 210 and the second tap A321, and a working voltage of the third rectifying unit 2801 is adapted to the fourth voltage to suit the second wireless charging mode. Similarly, a third rectifying unit 280N is coupled with the first end A1 of the coil 210 and the second tap A32N, and a working voltage of the third rectifying unit 280N is adapted to the $(N+3)^{th}$ voltage to suit an $(N+1)^{th}$ wireless charging mode.

In other words, in implementations illustrated in FIG. 8, the coil 210 includes N second taps, and N third rectifying units 280 are included (N>2). In this case, each third rectifying unit is coupled with the first end A1 and a corresponding second tap. The first end A1 and the second end A2 of the coil 210 and the first rectifying unit 220 are configured to be compatible with the first wireless charging mode, the first end A1 and the second tap A321 and the third rectifying unit 2801 are configured to be compatible with the second wireless charging mode, . . . , and the first end A1 and the second tap A32N and the third rectifying unit 280N are configured to be compatible with the $(N+1)^{th}$ wireless charging mode. In this way, the wireless power reception apparatus 200 can provide two or more wireless charging modes, such that the device to-be-charged can be compatible with more wireless charging schemes, which makes charging more convenient. It should be noted that, when more than one second tap is provided and more than one third rectifying unit is provided, for the charging control process corresponding thereto, reference can be made to the foregoing description, which is not repeated herein.

In other examples, functions of multiple second taps and multiple third rectifying units can also be achieved with one second tap A32 and one third rectifying unit 280, that is, functions of the structure illustrated in FIG. 8 can be achieved with the structure illustrated in FIG. 7. In this situation, the second tap A32 is a non-fixed tap and is adjustable in position, that is, the number of turns of the coil 210 is adjustable. As such, in different wireless charging modes, the control unit 201 adjusts the position of the second tap A32 according to the present wireless charging mode such that the number of turns of the coil 210 defined by the first end A1 and the second tap A32 is equal to that corresponding to the present wireless charging mode, and adjusts a working voltage of the third rectifying unit 280 such that the working voltage is suitable for the present wireless charging mode. In this way, requirements of various wireless charging modes can be met with aid of only one second tap A32 and one third rectifying unit 280. In addition, compared with a scheme of multiple second taps and multiple third rectifying units, the above scheme has advantages of simple structure, small volume, and low cost.

In other words, according to implementations, the second tap A32 can be a non-fixed tap, that is, the number of turns of the coil is adjustable. Alternatively, more than one second tap can be provided, that is, the number of turns of the coil is fixed. The above two manners can be selectively adopted according to actual needs.

It should be noted that, in implementations illustrated in FIG. 8, the wireless power reception apparatus 200 includes one matching unit 270 that is shared by all the rectifying units in the wireless power reception apparatus 200. However, in other implementations, the wireless power reception apparatus 200 can include multiple matching units 270. For details thereof, reference can be made to implementations illustrated in FIG. 5, which is not elaborated again herein.

In the wireless power reception apparatus provided herein, at least one second tap is provided in the coil and at least one third rectifying unit is provided to provide different wireless charging modes for the device to-be-charged (such as a mobile terminal), such that the device to-be-charged can be compatible with two or more wireless charging schemes, and thus charging of the device to-be-charged can be more convenient.

To solve the above problem, in the wireless power reception apparatus 200 provided herein, the receiving coil is provided with at least one tap (or the receiving antenna is provided with at least one in-between position) and at least one corresponding control switch is provided, to provide various wireless charging modes for the device to-be-charged with aid of the at least one tap and the at least one corresponding control switch, such that the device to-be-charged can be compatible with two or more wireless charging schemes. For example, besides a wireless charging scheme under the conventional QI standard, the device to-be-charged can be compatible with a high-voltage wireless charging scheme. This can effectively improve charging compatibility of the device to-be-charged and thus charging of the device to-be-charged will be more convenient.

Figure 9:
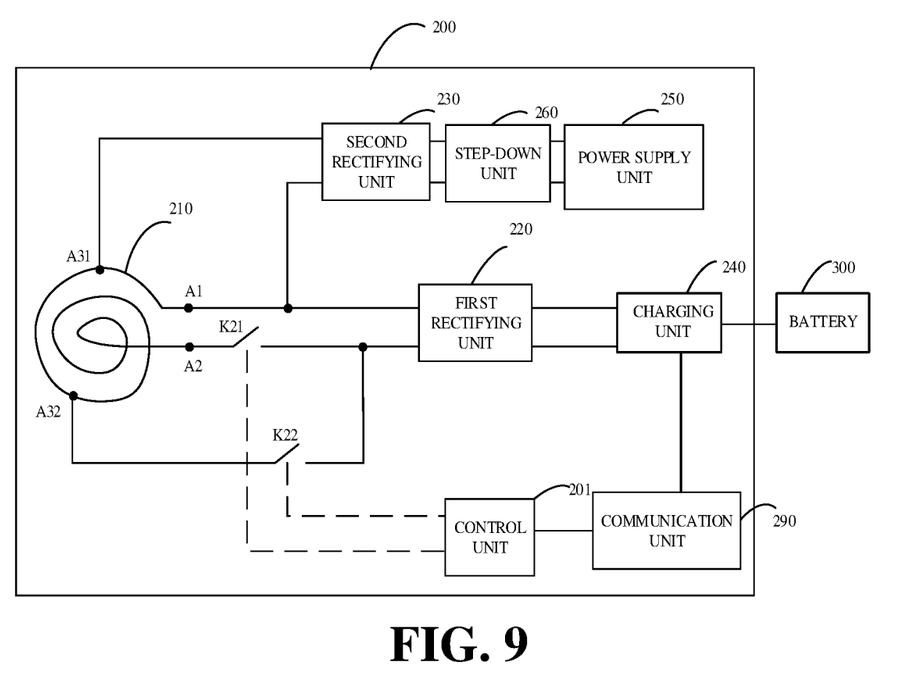
FIG. 9 is a schematic structural diagram of a wireless power reception apparatus according to other implementations.

In some implementations, as illustrated in FIG. 9, the tap A3 of the coil 210 includes the first tap A31 and the second tap A32, the coil defined by the first end A1 and the first tap A31 of the coil 210 is configured to provide the second voltage, the coil defined by the first end A1 and the second tap A32 of the coil 210 is configured to provide the fourth voltage, and the second rectifying unit 230 is coupled with the first end A1 and the first tap A31 of the coil 210.

In some implementations, the wireless power reception apparatus 200 further includes a first switch K21 and a second switch K22. The first switch K21 is coupled with the second end A2 of the coil 210 and the first rectifying unit 220. The second switch K22 is coupled with the second tap A32 and the first rectifying unit 220. The charging unit 240 is configured to apply one of the first voltage and the fourth voltage to the battery 300 for charging. The control unit 201 is configured to control the first switch K21 and the second switch K22.

For example, when the battery 300 is charged in the first wireless charging mode, the control unit 201 controls the first switch K21 to be closed and controls the second switch K22 to be opened, such that the second end A2 of the coil 210 is connected to the first rectifying unit 220. In this situation, the first AC outputted from the first end A1 and the second end A2 of the coil 210 is communicated to the first rectifying unit 220. The charging unit 240 controls the first rectifying unit 220 to be in a first working state, so that the first rectifying unit 220 converts the first AC into the first DC to be applied to the battery 300 for charging. When the battery 300 is charged in the second wireless charging mode, the control unit 201 controls the first switch K21 to be opened and controls the second switch K22 to be closed, such that the second tap A32 of the coil 210 is connected to the first rectifying unit 220. In this situation, the second AC outputted from the first end A1 and the second tap A32 of the coil 210 is communicated to the first rectifying unit 220. The charging unit 240 controls the first rectifying unit 220 to be in a second working state, so that the first rectifying unit 220 converts the second AC into the second DC to be applied to the battery 300 for charging. In this way, with aid of the first switch K21 and the second switch K22, various wireless charging modes can be implemented with only one first rectifying unit 220. This can satisfy different wireless charging schemes, thereby effectively improving charging compatibility and making charging more convenient. In addition, compared with implementations illustrated in FIG. 7, the number of rectifying units can be decreased, which is possible to reduce cost.

It should be noted that, according to implementations, the wireless power reception apparatus 200 does not indiscriminately adopt the first wireless charging mode or the second wireless charging mode to charge the device to-be-charged, that is, the control unit 201 does not randomly control the first switch K21 or the second switch K22 to be closed. Instead, the control unit 201 communicates with the wireless power supply apparatus to determine the present wireless charging mode.

Figure 10:
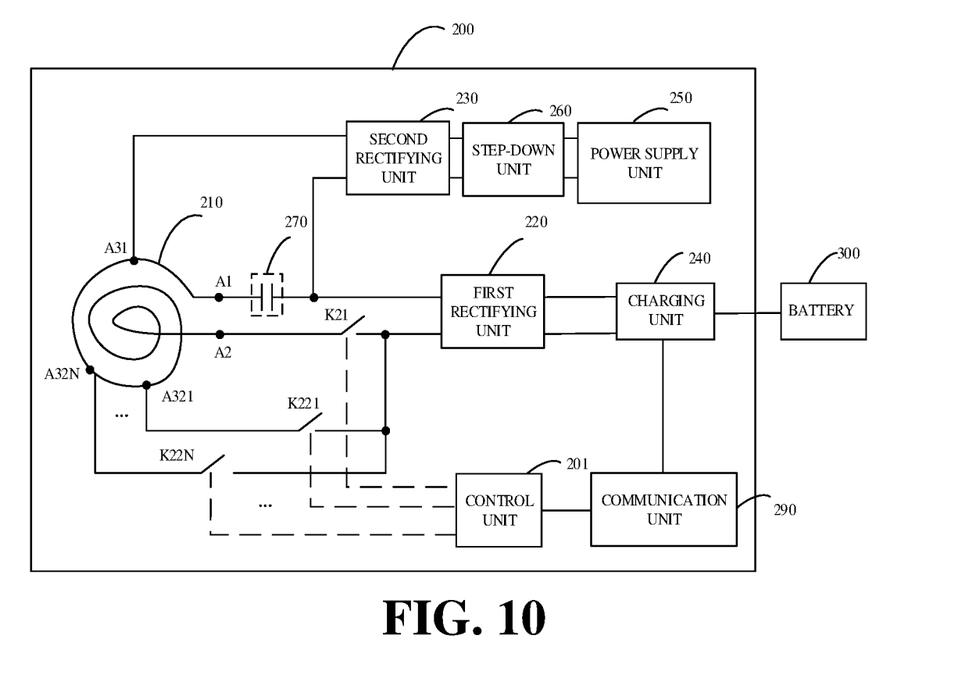
FIG. 10 is a schematic structural diagram of a wireless power reception apparatus according to other implementations.

In some implementations, as illustrated in FIG. 10, the wireless power reception apparatus 200 further includes a communication unit 290. The communication unit 290 is configured to communicate with the wireless power supply apparatus to determine the present wireless charging mode and determine the present charging voltage according to the wireless charging mode. For details thereof, reference can be made to the foregoing description, which will not be elaborated again herein.

It should be noted that, one or more than one second tap A32 of the coil 210 can be provided, and similarly, one or more than one second switch K22 can be provided, which is not limited herein.

In some implementations, as illustrated in FIG. 10, more than one second tap of the coil 210 is provided, and accordingly more than one second switch is provided. The coil defined by the first end A1 of the coil 210 and each of second taps (such as A321, . . . , and A32N) at different positions is configured to provide different voltages. For example, the coil defined by the first end A1 of the coil 210 and a second tap A321 is configured to provide the fourth voltage, . . . , and the coil defined by the first end A1 of the coil 210 and a second tap A32N is configured to provide an $(N+3)^{th}$ voltage. Accordingly, a second switch K221 is coupled with the second tap A321 of the coil 210 and the first rectifying unit 220. When the second switch K221 is closed, a working voltage of the first rectifying unit 220 is adapted to the fourth voltage to suit the second wireless charging mode. Similarly, a second switch K22N is coupled with the second tap A32N of the coil 210 and the first rectifying unit 220. When the second switch K22N is closed, the working voltage of the first rectifying unit 220 is adapted to the $(N+3)^{th}$ voltage to suit an $(N+1)^{th}$ wireless charging mode.

In other words, in implementations illustrated in FIG. 10, the coil 210 includes N second taps, and N second switches are included (N>2). The first end A1 and the second end A2 of the coil 210 and the first rectifying unit 220 are configured to be compatible with the first wireless charging mode (such as the high-voltage wireless charging mode), the second tap A321 and the second switch K221 are configured to be compatible with the second wireless charging mode, . . . , and the second tap A32N and the second switch K22N are configured to be compatible with the $(N+1)^{th}$ wireless charging mode (such as the wireless charging mode under the conventional QI standard). In this way, the wireless power reception apparatus 200 can provide two or more wireless charging modes, such that the device to-be-charged can be compatible with more wireless charging schemes, which makes charging more convenient. It should be noted that, when more than one second tap is provided and more than one second switch is provided, for the charging control process corresponding thereto, reference can be made to the foregoing description, which is not repeated herein.

In other examples, functions of multiple second taps can also be achieved with one second tap A32, that is, functions of the structure illustrated in FIG. 10 can be achieved with the structure illustrated in FIG. 9. In this situation, the second tap A32 is a non-fixed tap, that is, the number of turns of the coil 210 is adjustable. As such, in different wireless charging modes, the control unit 201 adjusts the position of the second tap A32 according to the present wireless charging mode such that the number of turns of the coil 210 defined by the first end A1 and the second tap A32 is equal to that corresponding to the present wireless charging mode, and adjusts the working voltage of the first rectifying unit 220 such that the working voltage is suitable for the present wireless charging mode. In this way, requirements of various wireless charging modes can be met with aid of only one second tap A32. In addition, compared with a scheme of multiple second taps, the above scheme has advantages of simple structure, small volume, and low cost.

In other words, according to implementations, the second tap A32 can be a non-fixed tap, that is, the number of turns of the coil is adjustable. Alternatively, more than one second tap can be provided, that is, the number of turns of the coil is fixed. The above two manners can be selectively adopted according to actual needs.

It should be noted that, in implementations illustrated in FIG. 10, the wireless power reception apparatus 200 includes one matching unit 270 that is shared by all the rectifying units in the wireless power reception apparatus 200. However, in other implementations, the wireless power reception apparatus 200 can include multiple matching units 270. For details thereof, reference can be made to implementations illustrated in FIG. 5, which will not be elaborated again herein.

In the wireless power reception apparatus provided herein, at least one second tap is provided in the coil and at least one second switch is provided to provide different wireless charging modes for the device to-be-charged (such as the mobile terminal), such that the device to-be-charged can be compatible with two or more wireless charging schemes, and thus charging of the device to-be-charged will be more convenient.

According to implementations, a mobile terminal is provided. The mobile terminal includes a battery, a wireless receiving chip, and the wireless power reception apparatus given with reference to any of FIG. 2 to FIG. 10. For an example, as illustrated in FIG. 2, the mobile terminal includes a battery 300, a wireless charging chip. The mobile terminal further includes a coil 210, which has a first end A1, a second end A2, and a tap A3. The coil defined by the first end A1 and the second end A2 is configured to provide a first voltage, and the coil defined by the first end A1 and the tap A3 is configured to provide a second voltage. The first voltage is higher than the second voltage. The mobile terminal further includes a first rectifying unit 220 coupled with the first end A1 and the second end A2 of the coil 210; a second rectifying unit 230 coupled with the first end A1 and the tap A3 of the coil 210; a charging unit 240 coupled with the first rectifying unit 220 and the battery 300, and configured to apply the first voltage to the battery 300; and a power supply unit 250 coupled with the second rectifying unit 230 and the wireless receiving chip, and configured to apply the second voltage to the wireless receiving chip.

For details of the components of the mobile terminal, reference can be made to the foregoing description of the wireless power reception apparatus provided herein, and details will not be repeated to avoid redundancy.

The term "module" or "unit" used herein can refer the mobile terminal is a physical or logical structure that can be used to implement a function(s) or an action(s), and can be implemented through hardware, software, or a combination or hardware and software. The hardware used as a module or unit can be circuits, electronic elements or electronic components, or a combination of circuits and electronic components.

It should be noted that, the device to-be-charged according to implementations can be a terminal. The "terminal" can include but is not limited to a device configured via a wired line and/or a wireless interface to receive/transmit communication signals. Examples of the wired line may include, but are not limited to, at least one of a public switched telephone network (PSTN), a digital subscriber line (DSL), a digital cable, a direct connection cable, and/or another data connection line or network connection line. Examples of the wireless interface may include, but are not limited to, a wireless interface with a cellular network, a wireless local area network (WLAN), a digital television network (such as a digital video broadcasting-handheld (DVB-H) network), a satellite network, an amplitude modulation-frequency modulation (AM-FM) broadcast transmitter, and/or with another communication terminal. A communication terminal configured to communicate via a wireless interface may be called a "wireless communication terminal", a "wireless terminal", and/or a "mobile terminal". Examples of the mobile terminal may include, but are not limited to, a satellite or cellular telephone, a personal communication system (PCS) terminal capable of cellular radio telephone, data processing, fax, and/or data communication, a personal digital assistant (PDA) equipped with radio telephone, pager, Internet/Intranet access, web browsing, notebook, calendar, and/or global positioning system (GPS) receiver, and/or other electronic devices equipped with radio telephone receiver such as a conventional laptop or a handheld receiver. In addition, the device to-be-charged or terminal according to implementations can further include a power bank. The power bank can be charged by an adaptor to store energy to be provided to other electronic devices.

All or part of the above implementations can be implemented through software, hardware, firmware, or any other combination thereof. When implemented by software, all or part of the above implementations can be implemented in the form of a computer program product. The computer program product includes one or more computer instructions. When the computer instructions are applied and executed on a computer, all or part of the operations or functions of the implementations are performed. The computer can be a general-purpose computer, a special-purpose computer, a computer network, or other programmable apparatuses. The computer instruction can be stored in a computer readable storage medium, or transmitted from one computer readable storage medium to another computer readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer readable storage medium can be any computer accessible usable-medium or a data storage device such as a server, a data center, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

Those of ordinary skill in the art will appreciate that units and algorithmic operations of various examples described in connection with implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be appreciated that the systems, apparatuses, and methods disclosed in implementations herein may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device or unit, and may be electrical, mechanical, or otherwise.

Separated units as illustrated may or may not be physically separated. Components or parts displayed as units may or may not be physical units, and may reside at one location or may be distributed to multiple networked units. Some or all of the units may be selectively adopted according to practical needs to achieve desired objectives of the disclosure.

Various functional units described in implementations herein may be integrated into one processing unit or may be present as a number of physically separated units, and two or more units may be integrated into one.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus for wireless power reception, comprising:
   a coil comprising a first end, a second end, and a tap, wherein the coil defined by the first end and the second end is configured to provide a first voltage, and the coil defined by the first end and the tap is configured to provide a second voltage;
   a first rectifying unit connected with the first end and the second end of the coil;
   a second rectifying unit connected with the first end and the tap of the coil;
   a charging unit coupled with the first rectifying unit and configured to apply the first voltage to a battery; and
   a power supply unit coupled with the second rectifying unit and configured to apply the second voltage to a wireless receiving chip.

2. The apparatus of claim 1, further comprising:
   a step-down unit coupled between the second rectifying unit and the power supply unit and configured to decrease the second voltage to a third voltage to be applied to power the wireless receiving chip.

3. The apparatus of claim 1, wherein the first voltage is higher than the second voltage.

4. The apparatus of claim 1, further comprising a capacitor coupled in the coil and coupled with the first rectifying unit and the second rectifying unit via the first end.

5. The apparatus of claim 1, further comprising:
   a first capacitor coupled between the first end and the first rectifying unit; and
   a second capacitor coupled between the first end and the second rectifying unit.

6. The apparatus of claim 1, wherein the tap comprises a first tap and a second tap, the coil defined by the first end and the first tap of the coil is configured to provide the second voltage, the coil defined by the first end and the second tap of the coil is configured to provide a fourth voltage, and the second rectifying unit is coupled with the first end and the first tap of the coil.

7. The apparatus of claim 6, wherein the second tap is adjustable in position.

8. The apparatus of claim 6, further comprising:
   a third rectifying unit coupled with the first end and the second tap of the coil, wherein the charging unit is coupled with the third rectifying unit and is configured to apply one of the first voltage and the fourth voltage to charge the battery.

9. The apparatus of claim 8, wherein more than one second tap is provided, and more than one third rectifying unit is provided, wherein each of the more than one third rectifying unit is coupled with the first end and a corresponding second tap.

10. The apparatus of claim 8, further comprising:
    a first switch coupled with the second end and the first rectifying unit;
    a second switch coupled with the second tap and the third rectifying unit; and
    a control unit configured to control the first switch and the second switch, wherein
    the charging unit is configured to:
    apply the first voltage to the battery when the first switch is closed and the first rectifying unit is in a work state; or
    apply the fourth voltage to charge the battery when the second switch is closed and the third rectifying unit is in a work state.

11. The apparatus of claim 6, further comprising:
    a first switch coupled with the second end of the coil and the first rectifying unit;
    a second switch coupled with the second tap and the first rectifying unit; and
    a control unit configured to control the first switch and the second switch, wherein
    the charging unit is configured to apply one of the first voltage and the fourth voltage to charge the battery.

12. The apparatus of claim 11, further comprising a third rectifying unit coupled with the first end and the second tap of the coil, wherein the charging unit is coupled with the third rectifying unit and is configured to apply one of the first voltage and the fourth voltage to charge the battery, wherein more than one second tap is provided, more than one third rectifying unit is provided, and more than one second switch is provided, wherein each of the more than one third rectifying unit is coupled with the first end and a corresponding second tap.

13. The apparatus of claim 1, wherein the charging unit comprises a step-down circuit, which is configured to decrease the first voltage received from the first rectifying unit to obtain a decreased voltage to be applied to the battery.

14. The apparatus of claim 1, wherein the charging unit comprises a converting circuit configured to perform voltage control on the first voltage received from the first rectifying unit, wherein the converting circuit comprises:
    a stabilizing circuit coupled with the first rectifying unit; and
    a control circuit coupled with the battery and configured for constant voltage and constant current control.

15. The apparatus of claim 1, wherein a position of the tap is determined according to a voltage required by the wireless receiving chip.

16. The apparatus of claim 1, further comprising:
    a communication unit configured to communicate with a wireless power supply apparatus to determine a present wireless charging mode.

17. The apparatus of claim 16, further comprising:
    a detecting circuit coupled with the charging unit and the communication unit, and configured to detect a current or a voltage outputted from the charging unit and send information on the current or voltage detected to the communication unit, wherein the communication unit is further configured to communicate the information to the wireless power supply apparatus, and according to the information received, the present wireless charging mode is adjusted at the wireless power supply apparatus.

18. A mobile terminal, comprising:
a battery;
a wireless receiving chip;
a coil comprising a first end, a second end, and a tap, wherein the coil defined by the first end and the second end is configured to provide a first voltage, and the coil defined by the first end and the tap is configured to provide a second voltage;
a first rectifying unit connected with the first end and the second end of the coil;
a second rectifying unit connected with the first end and the tap of the coil;
a charging unit coupled with the first rectifying unit and the battery, and configured to apply the first voltage to the battery; and
a power supply unit coupled with the second rectifying unit and the wireless receiving chip, and configured to apply the second voltage to the wireless receiving chip.

19. The mobile terminal of claim 18, wherein the tap comprises a first tap and a second tap, the coil defined by the first end and the first tap of the coil is configured to provide the second voltage, the coil defined by the first end and the second tap of the coil is configured to provide a fourth voltage, and the second rectifying unit is coupled with the first end and the first tap of the coil.

20. The mobile terminal of claim 19, further comprising:
a third rectifying unit coupled with the first end and the second tap of the coil, wherein the charging unit is coupled with the third rectifying unit and is configured to apply one of the first voltage and the fourth voltage to charge the battery.

* * * * *